UNITED STATES PATENT OFFICE.

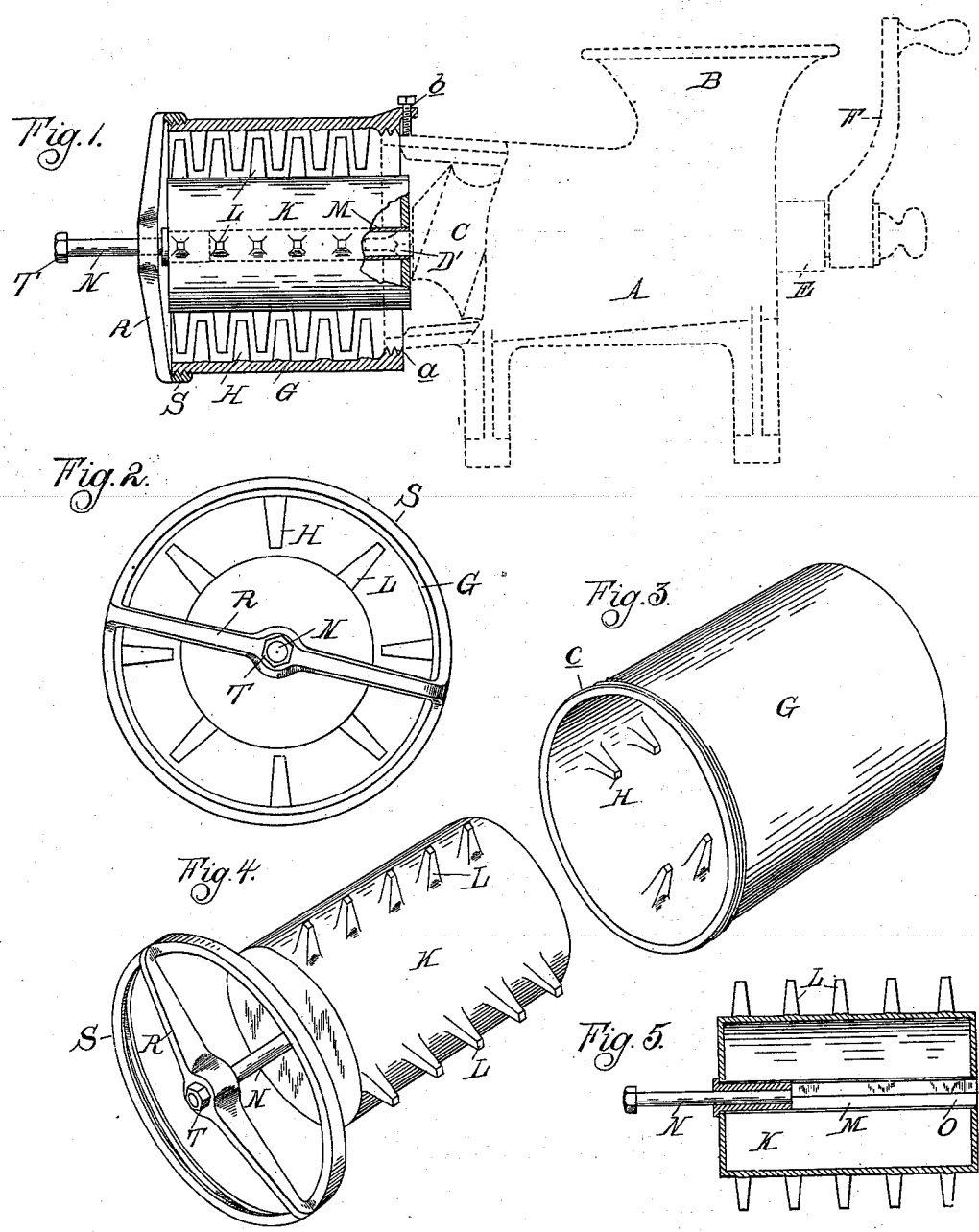

LOUIS BALLBACH, OF DETROIT, MICHIGAN.

ATTACHMENT FOR MEAT-CUTTING MACHINES.

SPECIFICATION forming part of Letters Patent No. 648,480, dated May 1, 1900.

Application filed April 12, 1899. Serial No. 712,737. (No model.)

*To all whom it may concern:*

Be it known that I, LOUIS BALLBACH, a citizen of the United States of America, residing at Detroit, in the county of Wayne and State of Michigan, have invented certain new and useful Improvements in Attachments for Meat-Cutting Machines, of which the following is a specification, reference being had therein to the accompanying drawings.

This invention is designed to form an attachment to the well-known form of meat-cutting machine described in United States Letters Patent No. 339,834 and others of like character; and the object of the invention is to adapt said machine for mixing articles of food after they have been chopped.

To this end the invention consists in a simple attachment adapted to be combined with the casing and feed-screw of said meat-cutter and thereby convert the same into an efficient mixing-machine which not only serves the immediate purpose of mixing the meat after it has been chopped by the machine, but serves a variety of other uses in mixing articles of food, as in making mince-meats, croquettes, &c., thereby greatly facilitating the work of the cook and promoting economy in housekeeping.

In the drawings, Figure 1 shows my attachment as arranged in operative connection with the meat-cutter. Fig. 2 is an end elevation of the attachment. Fig. 3 is a detached perspective view of the casing of the attachment. Fig. 4 is a perspective view of the mixing-cylinder detached, and Fig. 5 is a vertical section therethrough.

The dotted lines in Fig. 1 of the drawings represent that portion of the meat-cutter with which my attachment combines and which is composed of the casing A, the hopper B, the feed-screw C, journaled in the bearing E and provided with the handle F, and the journal-bearing at the rear end of the feed-screw, having a squared portion D'.

My attachment comprises an open-ended cylindrical casing G, which has at its front end an interior screw-thread $a$, adapted to engage with the exterior screw-thread with which the end of the casing A is provided, and a set-screw $b$ on the casing G is adapted to secure it against accidental unscrewing. Interiorly the casing G is provided with a number of radial spurs H, and at its rear end it has an exterior screw-thread $c$. Inclosed in this casing is a cylinder K, closed at the ends and provided with radial spurs L, adapted to project into the intervals between the spurs H of the casing G. This cylinder has axially secured therein a tube M, in one end of which is fixedly secured the stub-shaft N, while in the other end is formed a square socket O, adapted to receive the journal D' of the feed-screw C. Upon the stub-shaft N is journaled a cross-bar R, which carries the interiorly-screw-threaded ring S, adapted to screw on the end of the cylinder G. The stub-shaft N has a nut T at the end to hold the cross-bar R from slipping off.

In practice before applying my attachment to a meat-cutter of the kind referred to the latter is first put into the condition shown in Fig. 1, (by removing a perforated cap from the end of the casing A.)

When the attachment is properly secured, as shown, it will be seen that the squared portion D' of the feed-screw engages into the socket O of the cylinder K, and the latter is held in engagement therewith by the cross-bar R, in which the shaft N is journaled. The feed-screw C and cylinder G are thus revolved together by turning the handle F, and by feeding the material to be mixed into the hopper B the feed-screw C will carry the material into the cylinder G, where it will be thoroughly mixed by the action of the spurs L, which revolve in the interstices between the fixed spurs H. By the pressure of the feed-screw the material will be gradually expelled after being mixed; but by feeding the material faster or slower the operator has it entirely in his control how long the material shall remain in the mixing-cylinder. By feeding only at intervals the operator can mix each portion any desired length of time, and when he does want it to be discharged he feeds in fresh material, or, if the work is completed, he may remove the remaining portion by tilting the apparatus, so that the cylinder G is inclined toward the discharge end.

My attachment gives additional value to the meat-cutter not only for thoroughly mixing meat after it is chopped, but for adapting it to a variety of afteruses in culinary work.

My present construction differs in several features from a similar attachment for which I received grant of Letters Patent No. 621,203. The principal difference is that in my present construction the mixing-cylinder K can be independently removed without dismounting the cylinder G. One advantage of this is that after one kind of food has been mixed the removal of the cylinder K by unscrewing the ring S makes all the parts accessible for cleaning. My present construction also has the advantage that the cylinder G is open at both ends, which makes it easy to clean.

A further advantage is the prolonged stub-shaft N, which serves as a most convenient handle and support in manipulating the parts, in attaching them to the meat-cutter, and making the screwing of the cylinder G onto the casing and of the ring S onto the cylinder G much more easy to accomplish than in my former construction.

What I claim as my invention is—

1. A mixing attachment for meat-cutters, comprising the cylindrical casing G, having inwardly-projecting arms H, means for securing the casing to the meat-cutter, the cylinder K adapted to revolve within said casing and having arms L projecting into the interstices between the arms H of the casing means at one end of said cylinder to detachably connect it to the feed-screw of the meat-cutter and support the same, a stub-shaft at the opposite end of said cylinder, and the ring S provided with a central bearing for the stub-shaft of the cylinder loosely journaled therein, said ring being detachably secured to the end of the casing G and having an endwise play on the stub-shaft forming the means for supporting the cylinder in the casing independently detachable therefrom.

2. A mixing attachment for meat-cutters, comprising the cylindrical casing G, having inwardly-projecting arms H, means for securing the casing to the meat-cutter, the cylinder K adapted to revolve within said casing and having arms L projecting into the interstices between the arms H of the casing, a socket in one end of said cylinder to receive a projection on the feed-screw of the meat-cutter and support the same, a stub-shaft N at the other end of said cylinder and a ring S detachably secured to the casing G and having a central guide-bearing for the stub-shaft, said stub-shaft extending rearwardly through said bearing and having endwise movement therein and the nut T.

In testimony whereof I affix my signature in presence of two witnesses.

LOUIS BALLBACH.

Witnesses:
 OTTO F. BARTHEL,
 V. D. KINNER.